Jan. 29, 1924.
S. RATH
1,482,092
SELF ADJUSTING BEARING LOCK
Original Filed Feb. 2, 1921     2 Sheets-Sheet 1
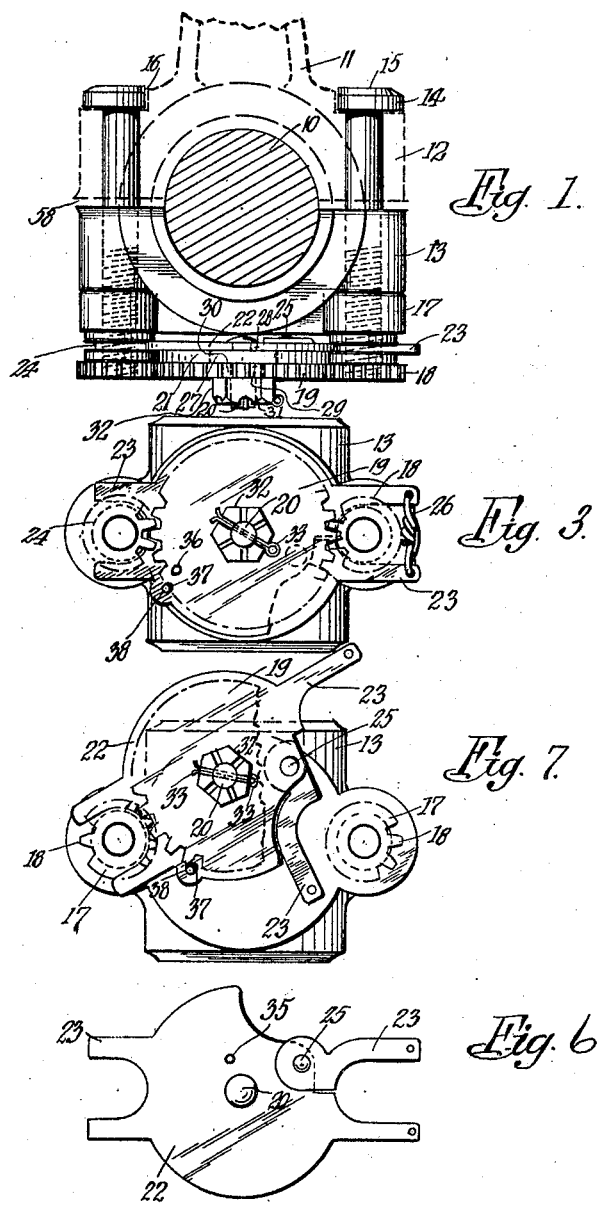
INVENTOR
Stephan Rath
BY
Carl Troves
ATTORNEY.

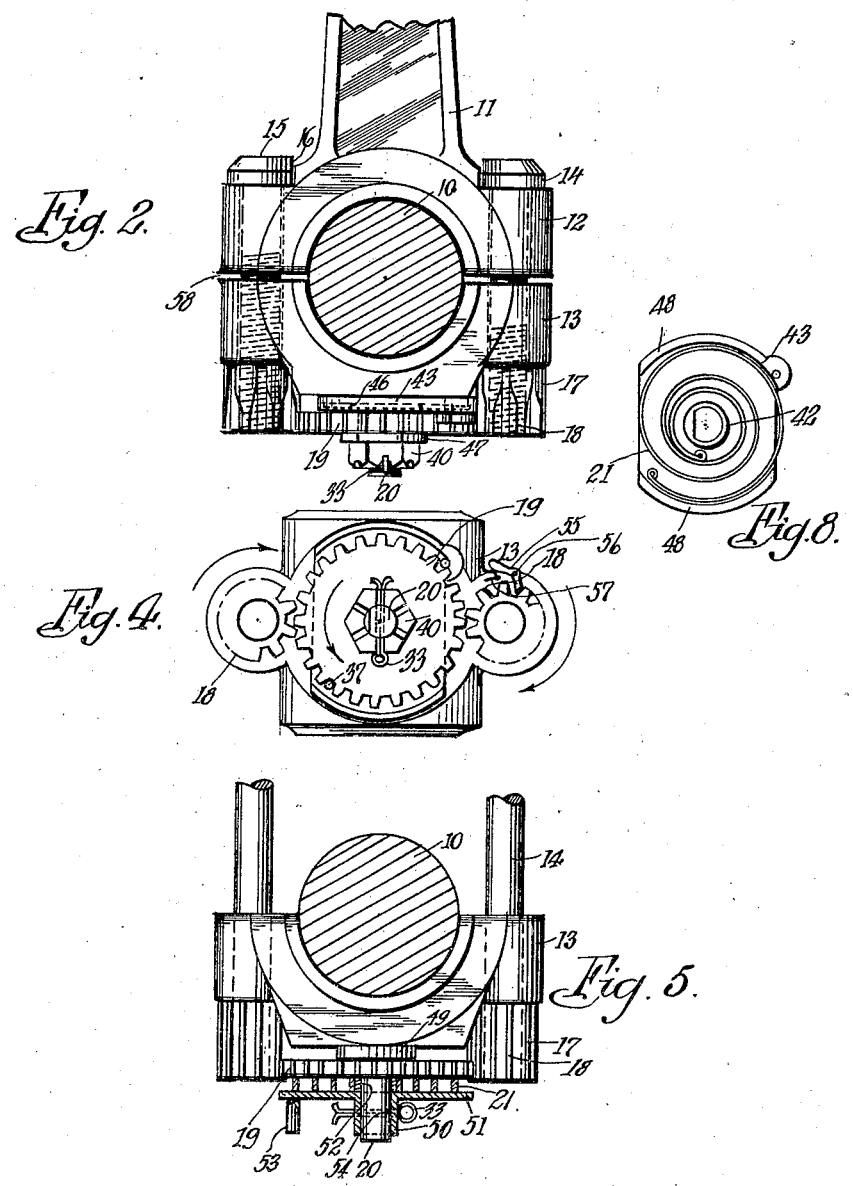

Patented Jan. 29, 1924.

1,482,092

UNITED STATES PATENT OFFICE.

STEPHAN RATH, OF CHICAGO, ILLINOIS, ASSIGNOR OF ONE-HALF TO AUGUST W. HORNIG, OF CHICAGO, ILLINOIS.

SELF-ADJUSTING BEARING LOCK.

Application filed February 2, 1921, Serial No. 441,797. Renewed May 25, 1922. Serial No. 563,676.

*To all whom it may concern:*

Be it known that I, STEPHAN RATH, a native of Germany, who have declared my intention to become a citizen of the United States, residing in the city of Chicago, county of Cook, and State of Illinois, have invented certain new and useful Improvements in Self-Adjusting Bearing Locks, of which the following is a specification.

The primary object of my invention is to provide a bearing lock which adjusts itself automatically so as to maintain the bearing constantly at a proper degree of tightness.

Incidental objects of my invention are to provide a bearing lock, of the character described, which can be manufactured at a comparatively low cost; can be easily adapted to almost any bearing; is thoroughly reliable, durable and practical; and the use of which will result in the automatic truing up of the journal or shaft revolving in the bearing.

In the drawings, Figs. 1 and 2 are sectional end-elevations of automobile crankshafts with connectingrod-bearings applied thereto, locked, respectively, by different forms of my device; Figs. 3 and 4 are bottom plan views of the locking devices shown in Figs. 1 and 2, respectively; Fig. 5 is an elevation of a lower bearing, bearing bolts and nuts, similar to those shown in Figs. 1 and 2, with a further variation of my device applied thereto; Figs. 6 and 7 are special views of certain parts pertaining to the construction shown by Figs. 1 and 3; and Fig. 8 is a like view of certain parts pertaining to the construction shown by Figs. 2 and 4.

Referring to the drawings, on crankshaft 10 there is mounted connectingrod 11 by means of upper bearing 12, integral with connectingrod 11; lower bearing 13; bearingbolts 14, having flat surfaces 15 engaging shoulders 16 to prevent bolts 14 from turning; and bearingbolt-nuts 17, provided with integral pinions 18, of equal size, and both engaging bolts 14 with a "right" thread. These pinions are engaged by a gear wheel 19, preferably mounted centrally between them on a pin 20, and engaged by a coilspring 21 in such a manner as to make it bear on the teeth of pinions 18, with a "left" turn, thereby constantly tending to give to pinions 18 a "right" turn, hence tending to tighten nuts 17, both equally, on bolts 14, and thereby to advance lower bearing 13 evenly towards upper bearing 12.

In construction A, shown in Figs. 1, 3, 6 and 7, pin 20 is mounted, preferably by riveting, in a plate 22 which is mounted on nuts 17 by means of bracketarms 23, extending from plate 22 into grooves 24, cut into nuts 17 a short distance above pinions 18. The preferred shape of this plate is shown by a top plan view thereof, in Fig. 6. At least one of arms 23 is not made integral with plate 22, but is oscillatably attached to it, as by a rivet 25, in such a manner that it may be swung back in order to make it possible to insert plate 22 in place, in the manner illustrated in Fig. 7, a bottom plan view, showing two of arms 23 and gear wheel 19 in engagement with one of nuts 17, and the other arms 23 and gear wheel 19 in position to be swung into engagement with the other nut 17, by using the previously engaged nut 17 as a pivot. After such engagement is effected, the movable arm 23 is swung into bearing position, and fastened therein by a wire 26. Pin 20 is preferably made with an enlarged round portion 27 (having shoulder 28 to rest against plate 22, and shoulder 29 for gear wheel 19 to rest against), a reduced round portion 30 (to serve as a bearing for gear wheel 19), and a threaded portion 31 to receive locknut 32, which is locked in place by cotterpin 33, penetrating pin 20. Portion 27 is made of such height as to secure between gear wheel 19 and plate 22 sufficient room for the accommodation and working of coilspring 21, the inner end of which is preferably attached to a pin 35 inserted in plate 22 near pin 20, while its outer end is preferably attached to a pin 36 inserted in gear wheel 19 near the outer edge thereof. A hole 37 is preferably provided near the circumference of plate 22 for the temporary insertion of a removable stopping pin 38 between the teeth of gear wheel 19, to prevent gear wheel 19 from turning while plate 22, with the parts attached thereto, is being placed in position, as shown in Fig. 7, it being necessary to "wind up" spring 21 before doing so.

In construction B, shown in Figs. 2, 4 and 8, pin 20 is threaded with a "right" thread into lower bearing 13, is made of even diameter, with one side of it flattened, below bearing 13, and with its lower end threaded for locknut 40 and perforated for the reception of cotterpin 33. Between bearing 13 and locknut 40 there is non-rotatably mounted on pin 20, with a snug, sliding fit, a round sleeve 42, having a large horizontal flange 43 extending therefrom at its upper end. Gear wheel 19 is mounted on a reduced portion of sleeve 42 between a circular boss 46 on said sleeve and nut 47, which is threaded on the lower end of sleeve 42. Boss 46 is made of such height as to secure between gear wheel 19 and flange 43 sufficient room for the accommodation and working of coilspring 21, which is inserted between flange 43 and gear wheel 19 in the same manner as between plate 22 and gear wheel 19 in construction A, its position being shown in Fig. 8. Flange 43 is preferably made of approximately equal diameter with gear wheel 19, and provided at its outer edge with down-turned rim 48, for the purpose of limiting the expansion of coilspring 21, except that the outer edges of flange 43 and rim 48 are cut away opposite to nuts 17, in order to make it possible to slip sleeve 42 over pin 20, while nuts 17 are in position. In this construction a hole 37 is also provided near the circumference of flange 43 for the same purpose as in construction A.

In construction C, shown in Fig. 5, pin 20 is a plain round pin, threaded into a boss 49 on lower bearing 13, with a "right" turn, and gear wheel 19 is mounted thereon, immediately adjoining boss 49. Below gear wheel 19 a sleeve 50 is provided on pin 20, from the upper edge of which extends horizontal flange 51. Between flange 51 and gear wheel 19, pin 20 is surrounded by a small washer 52 of sufficient height to keep flange 51 and gear wheel 19 a sufficient distance apart for the accommodation and working of coilspring 21, which is inserted between gear wheel 19 and flange 51 in the same manner as between gear wheel 19 and plate 22 in construction A. Sleeve 50 is provided preferably with a pin 53 for use in tensioning spring 21, and with horizontal perforations 54, in alignment with a similar perforation through pin 20, for the insertion of cotterpin 33, which in this construction is inserted only after spring 21 has been wound up. There is no need in this construction for hole 37 and for the use of stoppin 38; and flange 51 may be made perfectly round, as it is not necessary for it to pass pinions 18.

In connection with construction B, I have shown a pawl 55, mounted near one of pinions 18, by means of a pin 56, and pushed into engagement with such pinion 18, by a suitable spring 57, in such a way as to prevent such pinion (and thereby also the other pinion 18) from turning loose, unless pawl 55 is first moved out of engagement with it. It is plain that such pawl 55 might readily be mounted on plate 22, or on flanges 43 or 51, or on extensions of such plate or flanges, either for engagement with one of pinions 18, or for engagement with gear wheel 19; but in case it is placed in position for engagement with gear wheel 19, it would have to be placed out of engagement with gear wheel 19 at the time when spring 21 is wound up. In any case the purpose of pawl 55 is to prevent a turning loose of pinions 18 in case spring 21 should break.

In all cases where my device is applied, ample space is left between upper bearings 12 and lower bearings 13, as shown in Figs. 1 and 2, by the spaces marked with reference-figure 58, for the purpose of allowing the bearings to approach each other in accordance with the wear on them and on shaft 10. These spaces are of advantage for the lubrication of the bearing.

While I have shown and illustrated my device as applied to the crankshaft of an automobile and to a bearing which is held together by two bolts set a short distance apart, it may readily be applied to all kinds of bearings by modifications which will readily suggest themselves to any skilled mechanic. It is also obvious that my device may be changed in many ways without departing from the essentials of my invention. All such modifications and changes I intend to cover by my claims.

I claim:—

1. In bearing-locks, the combination of a multiplicity of bearing bolts; nuts with gear-teeth on said bolts for tightening the bearing; a gear engaging the nuts; and a tensioned spring for advancing the gear.

2. In bearing-locks, the combination of a multiplicity of bearing bolts; nuts with gear-teeth on said bolts for tightening the bearing; a gear engaging the nuts; a tensioned spring for advancing the gear; and a pawl to prevent a turning back of the nuts and the gear.

STEPHAN RATH.